T. F. HART.
FOLDING MACHINE.
APPLICATION FILED FEB. 1, 1913.

1,125,845. Patented Jan. 19, 1915.
5 SHEETS—SHEET 4.

Inventor:
Thomas F. Hart

UNITED STATES PATENT OFFICE.

THOMAS F. HART, OF LYNN, MASSACHUSETTS, ASSIGNOR TO HAMEL SHOE MACHINERY COMPANY, OF LYNN, MASSACHUSETTS, A CORPORATION OF MASSACHUSETTS.

FOLDING-MACHINE.

1,125,845.

Specification of Letters Patent.

Patented Jan. 19, 1915.

Application filed February 1, 1913. Serial No. 745,541.

*To all whom it may concern:*

Be it known that I, THOMAS F. HART, a citizen of the United States, residing at Lynn, county of Essex, State of Massachusetts, have invented a certain new and useful Improvement in Folding-Machines, of which the following is a specification, reference being had therein to the accompanying drawings.

My invention relates to a new and improved folding machine for turning over and folding down the thin skived edges of parts of boots and shoes, and the like.

It is particularly adapted for use for folding the edges of curved work, especially where the curves are of small radius.

The present invention has for its object particularly to provide improved feeding mechanism for advancing the work, said feeding mechanism being under the control of the operator so that he may lengthen or shorten the feed at will while the machine is in operation; mechanism for holding the work in proper engagement with the throat or exterior folding member; mechanism for maintaining the work in proper position at the time when the feeding mechanism retreats; new and improved mechanism for pressing or ironing down the fold which shall not be affected by bunches or thick spots in the work; and intermittent cutting or snipping mechanism under the control of the operator for snipping the edge of the fold as it passes around short curves in the work.

My machine does not have a goose-neck and its working elements are so constructed and arranged with relation to each other that they occupy a minimum of space centrally of the curve of the work, so that the edge of a curve of small radius may be folded.

My machine is also constructed with all the moving parts operated by a set of cams located adjacent each other on a single rotating shaft, thus making the machine extremely simple in construction and easy of adjustment.

The invention also relates to certain new and improved features of construction all as fully set forth in the following description, and illustrated in the accompanying drawings, and the novel features thereof are pointed out and clearly defined in the claims at the close of this specification.

The working instrumentalities are grouped together closely in the center of a table A and are supported thereby. The table is hinged to a base C, as shown at D, so that it and the attached parts may be lifted up for oiling and inspection, as required. In the center of the table is placed a polished work-plate B.

The feeding mechanism by means of which the work is advanced to the operating instrumentalities will first be described.

Figures 2, 6:
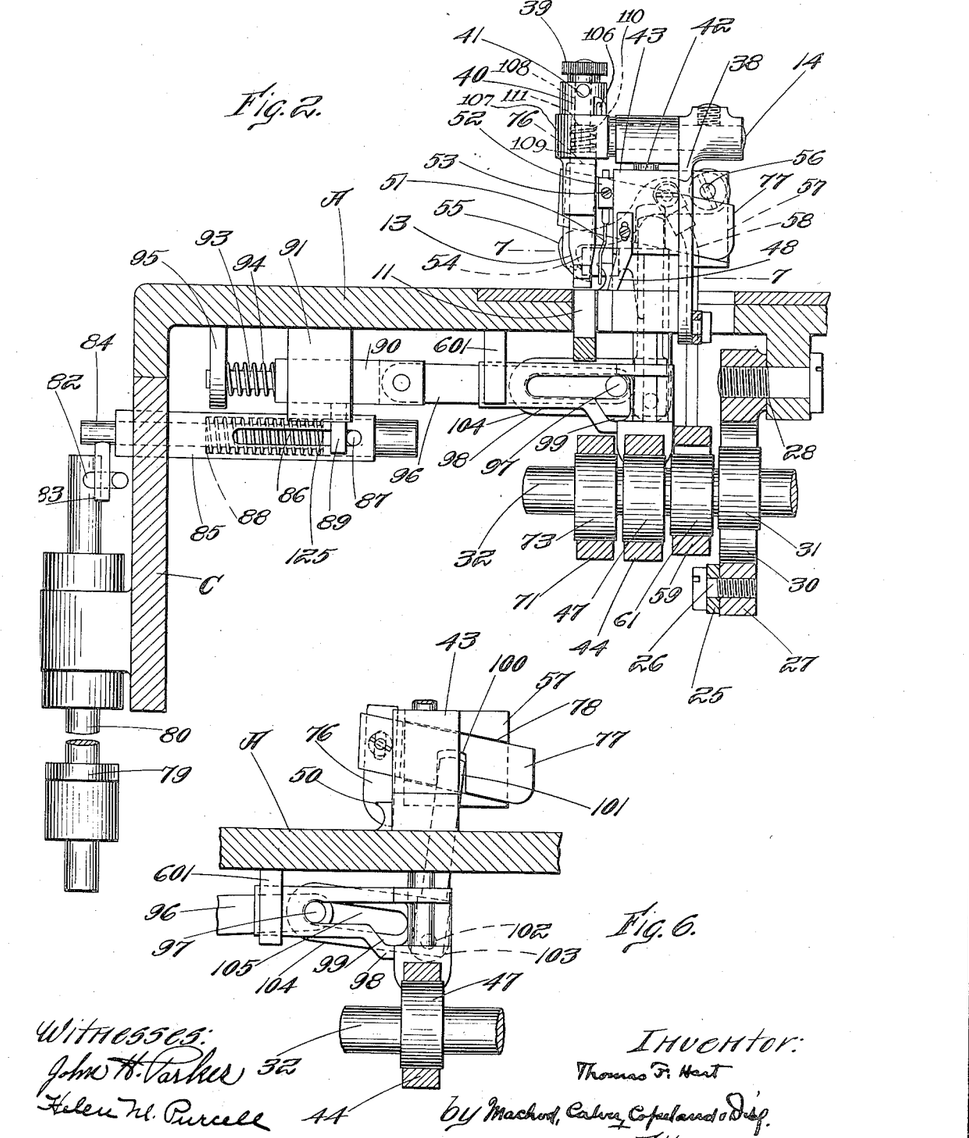
Fig. 2 is a front elevation of the machine, the portion below the table being in section.
Fig. 6 is a detail showing the knife or snipper and the operating mechanism therefor.
Figures 8, 9:
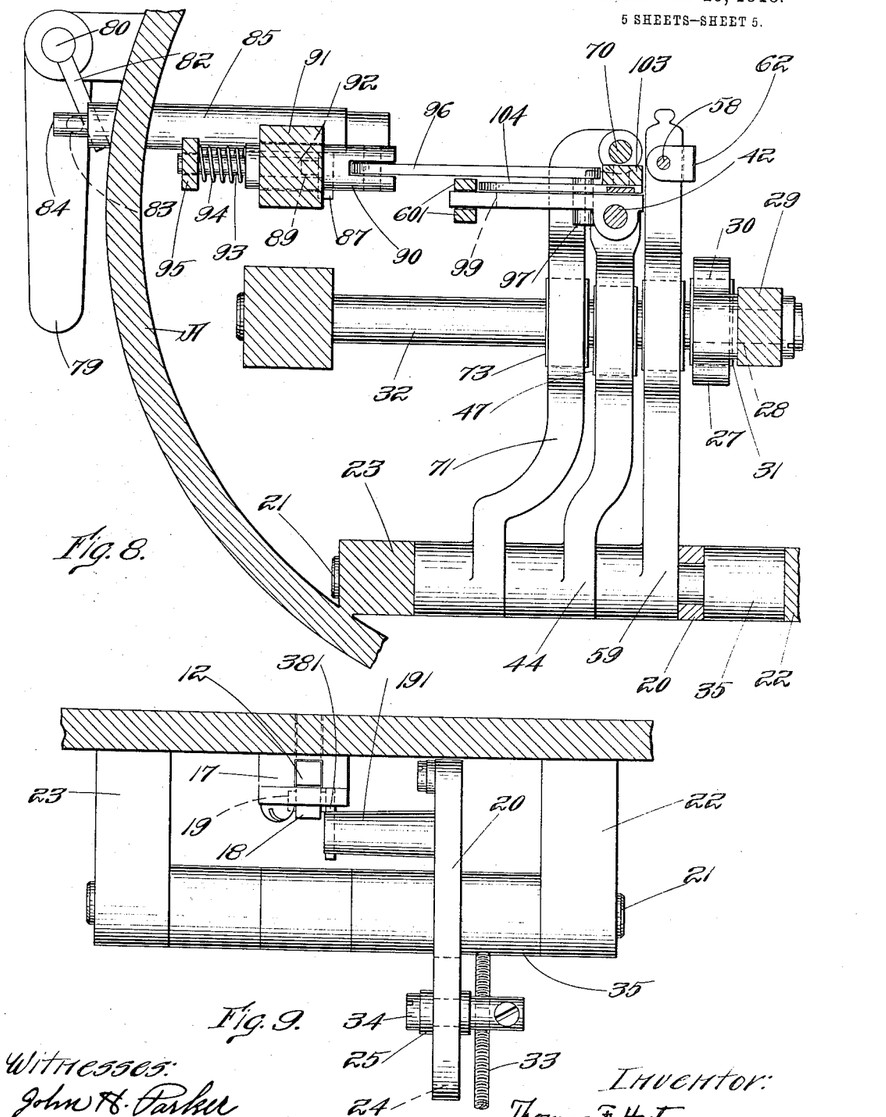
Fig. 8 is a top plan view of the mechanism below the bed plate, the lugs cast on the bed plate which supports the mechanism being shown in section.
Fig. 9 is a front elevation of the parts shown in Fig. 8.

It consists essentially of a yieldingly mounted top feed which swings to and fro to advance the work, being raised up on its rearward movement to clear the work, and a horizontally slidable bottom feed timed to coöperate with the said swinging top feed. The bottom feed 11, see particularly Fig. 2, is formed on one end of a rigidly mounted slidable feed bar 12. The top feed 13 forms one arm of a rock shaft 14. The upper or feeding surface of the bottom feed 11 is preferably smooth while the corresponding surface of the top feed 13 is roughened, as shown at 15, to enable it to take hold of the work firmly. The bottom feed bar 12 is slidable in two guides 16 and 17, and is provided on its lower side with two downwardly projecting abutments 18 which are engaged by a pin 19 adjustably mounted, as will be later described, on a projection 191 on the side face of the upper end of a swinging lever 20. The swinging lever 20 is mounted on a pivot shaft 21, supported in brackets 22, and 23, depending from the underside of the table A of the machine, near its front edge. This pivot shaft 21 serves to support the operating levers for various other members of the mechanism which will be hereinafter more fully described. The end of the swinging lever 20 is slotted, as shown at 24, for adjustable engagement with a link 25, the other end of which is connected at 26 to the slotted cam lever 27, of the type usually known as a straddle cam lever. Said cam lever 27 is pivoted at 28 to a bracket 29, secured to the underside of the table A. The cam lever 27 has formed therein a substantially rectangular slot 30, the sides of which are engaged by a four-motion cam 31 on the main shaft 32 so that the said cam lever and connected parts are positively moved in both directions. It will therefore be seen that the rotation of the main shaft 32 swings the cam lever 27 about the pivot 28 and forces the lower end of the swinging lever 20 back and forth for a distance depending upon the position of the point of engagement between the link 25 and the slotted end of the swinging lever 20. The normal position of the pivot pin 34 in the slot 24 is determined and may be varied by a screw 33 passing through an extension on the head of the pivot pin 34 and contacting with the underside of the sleeve 35 (see Fig. 9) on the side of the swinging lever 20. A spring 36 connected at one end with the table and at the other end to the link 25 normally holds the link 25 in the highest position permitted by the adjusting screw 33. To the link 25 there is also secured one end of a chain 150, the other end of which is secured to a treadle 151 so that the operator may, by a movement of the foot, change the position of the pivot pin 34 in the slot 24. This adjustment of the position of the pivot pin 34 produces a change in the length of swing of the swinging lever 20, and this is under the control of the operator when the machine is running.

The top feed member 13 is mounted on the rock shaft 14, and is operated by the swinging lever 20 as well as the lower feed member 11, so that uniformity of operation is secured. The swinging lever 20 extends upwardly a little above the projection 19 and affords a connection at 351 for a link 361, the opposite end of which is connected at 37 with the lower end of the arm 38 (see Fig. 1) of the rock shaft 14, on which the top feed 13 is mounted. Therefore, the movement of the swinging lever 20 produces a corresponding movement in the top feed 13 and the bottom feed 11, said movement being derived from the movement of the cam 31. The change in the position of the pivot pin 34 in the slot 24 in the lower end of the swinging lever 20, said change being made either by means of the screw 33 or the treadle 151 and chain 150, as previously described, produces a simultaneous and identical change in the movement of both the top and bottom feeds. In practice the operator adjusts the machine by the screw 33 for the longest feed required on the work to be done, and then when a shorter feed is required produces the required change while the machine is running by depressing the treadle 151. It will be understood of course that a relatively short feed is required on an outside curve while a long feed is required on an inside curve.

Figures 3, 7, 10:
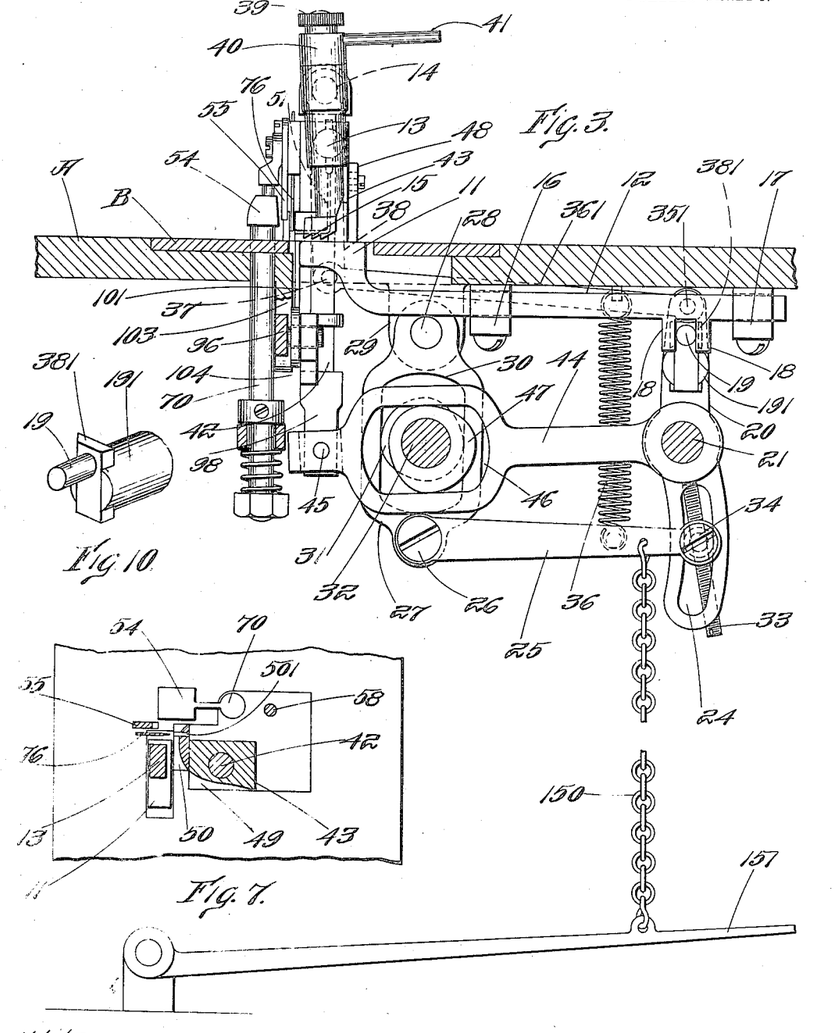
Fig. 3 is a side elevation, also partly in section, showing particularly the feeding mechanism, and operating parts therefor.
Fig. 7 is a section on line 7—7 Fig. 2, looking down.
Fig. 10 is a detail showing means for adjusting the pin 19.

As it is sometimes necessary when the machine is being assembled, or in the subsequent use of the machine to be able to vary slightly the movement of the bottom feed with relation to the movement of the top feed, I form the pin 19 on the upper end of a short slide 381 (see Fig. 10) contained in a dove-tail or fork cut in the end of the projection 191 on the swinging lever 20. By this means the distance of the pin 19 from the center of oscillation of the swinging lever 20 may be slightly adjusted and the movement of the bottom feed with relation to the movement of the top feed correspondingly varied so that the movements of the two may be exactly uniform as otherwise the work will be puckered.

The top feed is provided with the ordinary movements to release the work and the adjustment required in this class of machinery for different thicknesses of work. The top feed may be lifted when required by turning a cam member 40 (see Fig. 2) by the handle 41 so that the work can be taken out and the pressure which it exerts on the work may be varied for different thicknesses of work by means of the thumb screw 39.

The cam member 40 coöperates with a pin 106 secured on the upper end of the tube 107 within which the rod 108, the lower end of which forms the top feed 13, is received. A shoulder is formed on the said rod 108 as shown at 109 against which a spring 110 bears. The upper end of said spring 110 engages a shoulder 111 formed on the inside of said tube so that the spring tends to hold the top feed down on the work. From the foregoing it will be seen that the top feed is held in yielding contact with the work so that it will not be broken in case there is a bunch or thick spot in the work. The thumb screw 39 serves to raise or lower the foot slightly into various positions for different thicknesses of work and the handle 41 by which the cam member 40 is rotated serves to raise and to lower the top feed. The rock shaft 14 on which the top feed 13 is mounted is itself carried on the upper end of a rod 42 which is vertically slidable in the fixed post 43 which forms a portion of the folding throat as will be hereinafter described. The slide rod 42 is given a vertical movement by means of the straddle cam lever 44 pivoted to the pivot shaft 21, the slide rod 42 and the cam lever 44 being connected at 45. The cam lever 44 has a rectangular slot 46 formed therein with the sides of which a four-motion cam 47 on the main shaft 32 contacts so that the cam lever 44 and connected parts are given a positive movement in both directions by the said cam, said movements being properly timed with relation to the other parts.

The work is guided to the folding instrumentalities by means of a gage 48 secured to the post of the machine. The post 43 is cut away as shown at 49 in Fig. 7 to form part of the throat, and has secured to it a throat piece 50 likewise cut away and having a curve continuous with the curve of the cut away portion of the pillar 43. These two parts together form the throat into which the edge of the work is guided by the gage 48 so that the thin skived edge of the work will be turned up at right angles to the body of the work and then folded over. The post 43, the throat 50 and the various connected parts, are grouped together in the smallest space possible and are made as small as is consistent with the necessary strength of the parts so that it is possible to fold the edges of pieces of work having curves of small radius, as for instance the throat of a vamp for a child's shoe.

In practice I find it possible to construct a machine which will fold the edge of a curve of half inch radius. This construction is very important and adapts the machine for use on a large variety of work on which it could not be otherwise used, and at the same time does not interfere with its utility in connection with straight work or work having curves of large radius.

A member 51 (see Fig. 1) which for convenience I call the folding finger, composed of a bent piece of wire rigidly but adjustably supported on the post 43 adjacent the top feed is provided for the purpose of guiding the work just at the folding point and holding the portion of the work which is being folded in contact with the walls of the throat. This member insures much more accurate folding than has heretofore been possible. The lower end of this folding finger 51 is bent into a substantially horizontal position and lies in the fold just at the point where the folding takes place. The folding finger 51 is adjustable vertically in the clamp 52 formed on the side of the post 43, it being necessary to loosen the screw 53, after which the finger may be moved up or down as required.

In machines of this character, so far as known to me, it has heretofore been customary to have the work pass directly from the folding mechanism to the presser or hammer 54 (see Figs. 3 and 7 particularly) and to make no other provision for maintaining the work in position with relation to the folding mechanism. It has resulted that, during the backward movement of the feeding members, the work has sometimes become displaced slightly so that an irregular fold is produced, or one not made in accordance with the position of the gage. To obviate this difficulty I provide a movable finger 55 which I term the holder which engages the work at a point between the feeding members and the presser 54, and holds the work down firmly on the bed plate B from the time when the feeding members have ceased their forward movement to the time when they begin it again, this being for three-quarters of a revolution of the main shaft. This holder consists of a finger 55 pivoted at 56 to a plate 57 secured to the back side of the post 43. A link 58 extends downwardly and is yieldingly connected at its lower end with the straddle cam lever 59 pivoted at one end to the pivot shaft 21, hereinbefore described. A cam 61 on the main shaft 32 operates the said cam lever 59. To the lower end of the link 58 is rigidly secured a member 62 which extends around the end of the cam lever 59. The end of the cam lever is slidable on the link 58 and a spring is interposed between the member 62 and the end of the cam lever so that when the holder 55 strikes a thick place in the work the parts may yield and danger of breakage may be avoided.

The hammer is reciprocated vertically being mounted on the upper end of the rod 70 which is slidable in the frame of the machine and is moved by means of a straddle cam lever 71, pivoted to the pivot shaft 21 hereinbefore mentioned. An eccentric cam 73 on the main shaft 32 operates the said cam lever. A yielding connection between the presser rod 70 and the end of the cam lever 71 is afforded by a spring 73 surrounding the lower end of the rod and bearing against a nut 74 thereon. The upper end of the spring contacts with the underside of the end of the cam lever 71 and a collar 75 is secured to the presser-rod 70 to limit the motion of the spring. It will be seen that this acts in such a manner that when the predetermined pressure on the work has been reached the spring 73 yields and the hammer or presser actuating mechanism is not strained.

As it is desirable to snip the edge of the portion of the work to be folded for a short distance from its extreme edge when a curve is to be folded, and as it is in general undesirable to snip the edge of straight work, I provide an intermittently operated knife or snipper 76, under the control of the operator. This knife 76 coöperates with the sharp edge of a slit 501 in the throat piece 50 and is so located and constructed as to operate upon the work at a point between the feed members and the holder 55 at which time the edge of the work is turned up into a substantially vertical position. The blade 76 of the knife is mounted on an oblique slide 77 carried in a proper guideway 78 formed in the plate 57 which also supports the pivot for the holder 55 as previously described. It will therefore be seen while the blade of the knife 76 moves transversely of the edge of the work in a substantially horizontal direction, it also descends slightly, this being for the purpose of having the knife raised up above the work as far as possible when the knife is not in operation and also to insure the snip or incision in the edge of the work extending to the line of fold.

Figure 1:
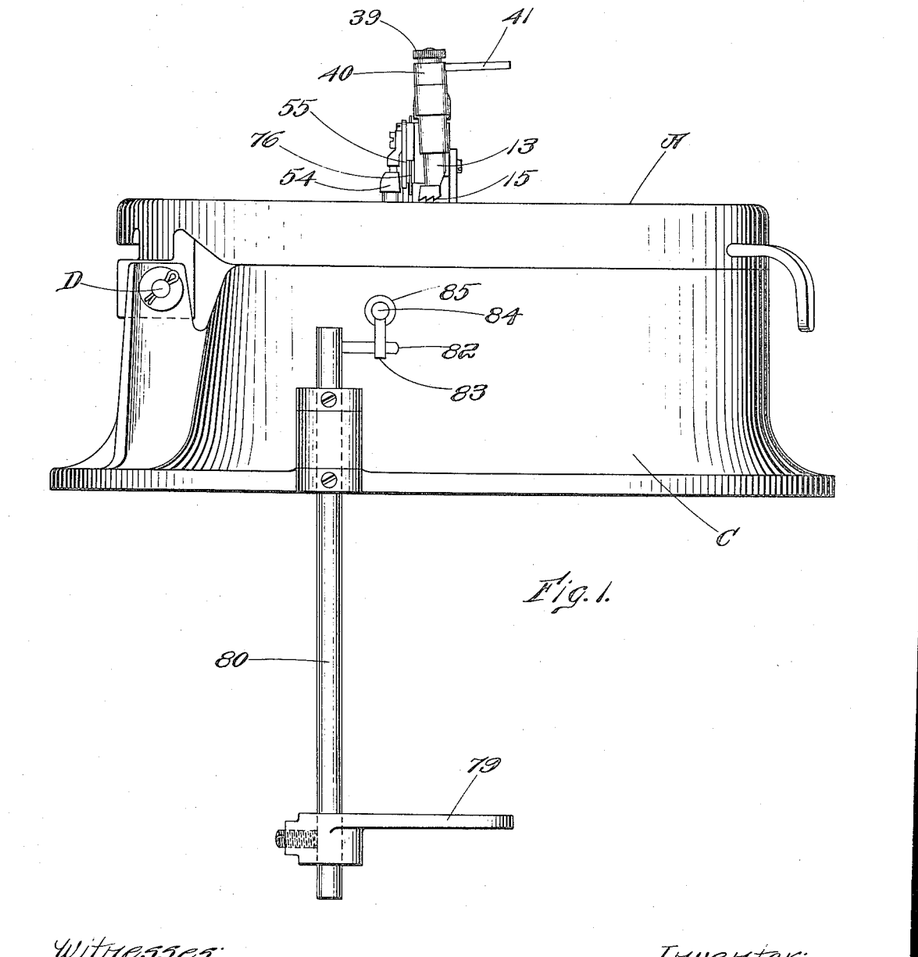
Figure 1 is a side elevation of a machine embodying my invention.

The snipping mechanism is operated intermittently in the following manner: At 79 is shown a knee member which the operator moves by the pressure of his knee, this being a convenient arrangement as it enables the operator to have his hands free for other purposes. The knee member 79 is pivoted at the lower end of a rod 80 rotatably secured to the base C of the machine. A pin 82 projects from the rod 80 in a substantially horizontal direction and engages a vertical pin 83 on the under side of a horizontal slide rod 84. Said horizontal slide rod 84 slides in a slotted sleeve 85 and is normally held toward the right as shown in Fig. 2 by a spring 86 one end of which bears against a shoulder 125, and the said slide rod 84 is provided with a pin 87 extending horizontally and toward the front of the machine, while the other end of the spring 86 is against an abutment 88 formed in the sleeve 85. The horizontal pin 87 contacts with the vertical pin 89 which extends downwardly from another horizontal slide 90 carried in a lug 91 on the underside of the frame of the machine. This lug 91 is slotted as shown at 92 to permit a sliding movement of the slide rod 90 and the pin 89 carried thereby. The left hand end of the slide rod 90 as seen in Fig. 1 is turned down as shown at 93 to a diameter smaller than that of the remainder of the slide rod and this portion is surrounded by a spring 94, one end of which rests against an abutment 95 and the other end of which rests against the shoulder formed by turning down the end of the slide rod 90. The spring 94 keeps the slide rod 90 in the position shown in Fig. 2, that is as far to the right as possible. The right hand end of the slide rod 90 is forked and there is secured to it a link 96 provided at its extreme end with a horizontal pin 97. On the lower end of the vertical slide rod 42 which carries the top feed rock shaft 14 is secured a slotted member 98, see also Fig. 6. This slotted member 98 therefore has a vertical reciprocating motion coincident with the vertical reciprocation of the upper feed member and its end is guided in ways or guides 601, 601 secured to the lower side of the table A (see also Fig. 8). The slot 99 in the member 98 is wider at the right hand end than at the other and the pin 97 on the link 96 is located in the said slot, being normally in the widened portion thereof and stationary. The widened portion of the slot has a width sufficient to permit the vertical reciprocation of the slotted member 98 without the walls of the slot 99 coming in contact with the pin 97. Therefore as long as the pin 97 is in the position shown in Fig. 2 it remains stationary and the slotted member 98 reciprocates without moving it. The snipper slide 77 on which the knife 76 is secured is provided with a notch 100 on its lower side which is engaged by the upper end of a bell crank 101 pivoted at 102 to a lug 103 on the underside of the table A of the machine. The other arm 104 of the bell crank is slotted as shown at 105 and the pin 97 on the link 96 passes through this slot as well as the slot in the reciprocating member 98.

From the foregoing it will be seen that when the operator presses his knee against the knee member 79 he pulls the slide rod 84 to the left by engagement of the pin 82 with the pin 83. The movement of the slide rod 84 to the left gives the slide rod 90 a corresponding movement through the engagement of the pin 87 with the pin 89. The movement of the slide rod 90 to the left moves the pin 97 from the wide end of the slot 99 in the member 98 into the narrow end of the slot. As soon as the pin 97 is moved into the narrow end of the slot 99, it is carried up and down by the slotted member 98, and as it also passes through the slotted arm 104 of the bell crank lever, the reciprocations of the member 98 then swing the bell crank lever about the pivot 102 and reciprocate the knife in the slide 77. This vertical movement of the pin 97 is permitted because the link 96 is pivoted to the end of the slide rod 90. The reciprocations of the knife therefore occur once for each cycle of movement of the feed members and the same are timed to occur during the retreat of the feed members, and therefore when the work is held stationary by the holder 55.

By constructing the mechanism which sets the knife 76 in motion as described, it is possible to have the snipper controlled by the operator's knee, and, at the same time, the machine is constructed so that no parts need to be disconnected when it is desired to turn up the table A and attached parts as is often required for oiling and inspection. This results from the fact that while the slide rod 90 and pin 89, depending therefrom are supported in lugs on the underside of the table A, the slide rod 84 and its pin 87 are supported by the base C of the machine, and, therefore, when the table is turned up on its hinge D, the pin 89 is moved out of contact with the pin 87, and when the table is replaced the pin 89 is again in position to be moved by the pin 87 but there is no permanent connection between the two.

Another important feature of the snipping mechanism hereinbefore described is that the knife 76 is normally at the extreme left hand end of its movement and is therefore up out of the way of the work when not in use. This results from the fact that the pin 97 which passes through the slot in the arm 104 of the bell crank and also through the slot 99 in the slotted reciprocating member 98 is carried by the member 98 to its lowest position and left there, remaining stationary until the snipping mechanism is again set in action by a movement of the knee member 79.

From the foregoing it will be observed that all the working members of my machine are operated by four cams 31, 47 61 and 73 located adjacent each other on the main shaft 32 so that the actuating mechanism is simple and compact, but also accessible.

Figures 4, 12:
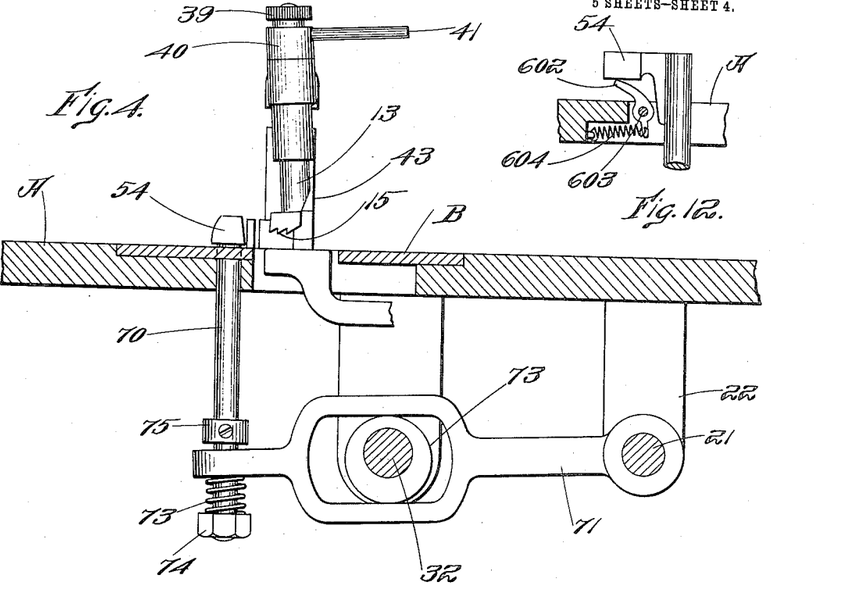
Fig. 4 is a similar side elevation showing the hammer or presser and operating mechanism therefor.
Fig. 12 shows a modification of the hammer or presser.
Figures 5, 11:
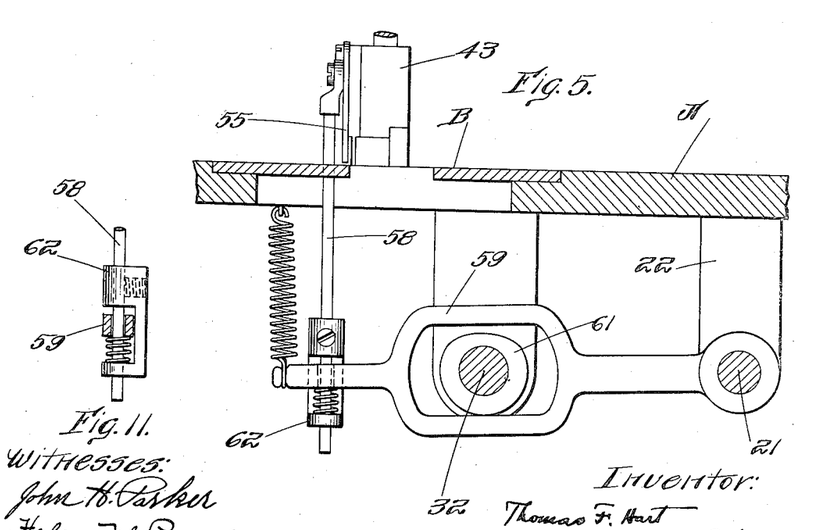
Fig. 5 is another side elevation showing the holder and operating mechanism therefor.
Fig. 11 is a detail showing the cushioning means for the holder operating mechanism.

In Fig. 12 there is shown a modification of the presser. It consists in an auxiliary presser 602 hinged at 603 to the feed plate and operated in one direction by the presser 54 and in the other direction by a spring 604. This device may be desirable because it tends to bend the edge of the material in toward the body of the work before pressing it down, and therefore obviates any tendency to crush the edge of the work instead of forming a perfect fold which might occur sometimes if the edge of the work stood exactly vertical at the time when the presser 54 began to descend.

What I claim is:

1. In a machine of the character described, the combination with a reciprocating bottom feed, and an oscillating top feed, said feeds having movements in a common vertical plane, of operating means therefor comprising a single lever swinging in a vertical plane, connections to the said bottom feed and the said top feed and a cam actuating the said swinging lever.

2. In a machine of the character described, the combination with a reciprocating bottom feed, and an oscillating top feed, said feeds moving in a common vertical plane, of operating means therefor comprising a lever swinging in a vertical plane parallel to the plane of the feeds, connections to the said bottom feed and the said top feed, a cam actuating the said swinging lever, and means for adjusting the length of swing of the said swinging lever.

3. In a machine of the character described, the combination with a reciprocating bottom feed, and an oscillating top feed, said feeds having movements in a common vertical plane, of operating means therefor comprising a lever swinging in a vertical plane parallel to the plane of the feeds, said swinging lever being slotted, connections from the swinging lever to said bottom feed, and to the said top feed, a cam, a member actuated by said cam and engaging the said slotted swinging lever, and means for varying the point of engagement of the said member in the said slot in the swinging lever, whereby the length of movement of the said feed members may be simultaneously and correspondingly adjusted.

4. In a machine of the character described, a horizontally reciprocating bottom feed, an oscillating top feed, a swinging lever, connections between said swinging lever and said top and bottom feeds, and adjusting means for changing the point of engagement of one of said connections with respect to the center of oscillation of the said swinging lever whereby the length of stroke of one of said feed members is varied.

5. In a machine of the character described, the combination with a top and a bottom feed, said feeds having movements in a common vertical plane, of a slotted lever operating said feeds and swinging in a vertical plane, a cam and a cam lever one end of which engages the slot in the swinging lever, and means under the control of the operator to change the position of the point of engagement of the said end of the cam lever with the slot in the swinging lever to vary the feed while the machine is in motion.

6. In a machine of the character described, the combination with a top and a bottom feed, of a folding throat and a stationary finger adjacent the folding throat, the effective portion of said finger being parallel with the line of movement of the work and engaging the work in the angle of the fold.

7. In a machine of the character described, the combination of a top and a bottom feed, folding means, a presser and a periodically moving holder engaging the work at a point between the effective portions of the feeds and the presser.

8. In a machine of the character described, the combination with a top and a bottom feed, of a folding throat at one side of said feeds, a reciprocating presser, and an oscillating work holder contacting with the work between the said presser and the said feeds, the movement of oscillation of the said work holder to engage the work being toward the folding throat.

9. In a machine of the character described, the combination with a folding throat, of feeding means for advancing the work, a presser, a knife to snip the edge of the work, said knife being located between the folding throat and the presser.

10. In a machine of the character described, the combination with a folding throat, of feeding means to advance the work, a presser, an oscillating work holder contacting with the work between the presser and the feeding means, and a knife between the work holder and the feeding means.

11. In a machine of the character described, the combination with a folding throat, of intermittently acting feeding means for advancing the work, a knife, a downwardly inclined knife slide located transversely of the line of movement of the work, and a presser, said knife acting to snip the edge of the work after it has been partly folded and before it has been pressed down.

12. In a machine of the character described, snipping means comprising a reciprocating knife and intermittent operating means therefor comprising a slotted member on a reciprocating part of the machine, the slot in said member being wider at one end than at the other, an operating member for the knife and a movable pin located in the slot in the slotted member, so that when the pin is in the wide end of the slot the pin will not be engaged by the slotted member and when it is in the narrow end of the slot the said operating member will be moved by the pin.

13. In a machine of the character described, snipping mechanism comprising a reciprocating knife, a bell-crank lever, one arm of which operates the knife and the other arm of which is slotted, a slotted member on a reciprocating part of the machine, having therein a slot which is wider at one end than at the other, and a slidable member having thereon a pin in both of said slots, so that when the slidable member is in one position the pin is in the wide end of the slot and the bell crank lever is stationary and when the slidable member is in another position the pin is the narrow end of the slot and the bell-crank lever moves with the reciprocating part.

14. In a machine of the character described, a base, a table removably supported on the said base, intermittently actuated snipping mechanism supported by the table, a downwardly projecting pin on the parts supported by the said table and operating to set the snipping mechanism in operation, a slide on the said base, a pin on the said slide in contact with the said downwardly projecting pin, and means under the control of the operator to move the said slide, the pins being in contact when the table is in working position.

In testimony whereof I affix my signature, in presence of two witnesses.

THOMAS F. HART.

Witnesses:
GEORGE P. DIKE,
ALICE H. MORRISON.